(12) United States Patent
Boutin

(10) Patent No.: US 6,484,976 B1
(45) Date of Patent: Nov. 26, 2002

(54) CENTER BEARING HANGER ASSEMBLY

(75) Inventor: Robert Boutin, Birmingham, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/858,100

(22) Filed: May 15, 2001

(51) Int. Cl.[7] ............................................... E21F 17/02
(52) U.S. Cl. ........................ 248/60; 248/613; 248/610; 248/634; 248/639; 248/612; 180/379; 280/348; 74/89.15
(58) Field of Search ................................. 180/379, 380, 180/381, 382; 248/60, 344, 639, 675, 612, 317, 613, 58, 610, 634, 635; 384/252; 254/92; 74/89.15; 280/348

(56) References Cited

U.S. PATENT DOCUMENTS

| 1,052,837 | A | * | 2/1913 | Makutchan ................. 384/258 |
| 2,257,630 | A | * | 9/1941 | Wahlberg et al. ............. 180/57 |
| 2,720,931 | A | * | 10/1955 | Thannhauser ............... 180/298 |
| 2,828,095 | A | * | 3/1958 | Beck et al. ................. 248/612 |
| 2,868,484 | A | * | 1/1959 | Burrise ....................... 248/612 |
| 3,937,089 | A | * | 2/1976 | Gartner ......................... 74/25 |
| 5,370,464 | A | * | 12/1994 | Blaha ......................... 384/252 |
| 5,445,241 | A | * | 8/1995 | Nakamura et al. .......... 180/296 |
| 6,345,680 | B1 | * | 2/2002 | Hill ............................. 180/376 |
| 6,402,119 | B1 | * | 6/2002 | Miska ......................... 248/613 |

* cited by examiner

Primary Examiner—Kimberly Wood
(74) Attorney, Agent, or Firm—Mick A. Nylander

(57) ABSTRACT

A center bearing hanger assembly (68) for supporting a drive shaft (62) of a vehicle is provided. The center bearing hanger assembly (68) includes a center bearing (66), which supports the drive shaft, having an outer housing (76). The outer housing (76) is mechanically coupled to a male hanger (102). The male hanger (102) is received by a female receptacle (104). The female receptacle (104) is attached to an undercarriage of the vehicle. The center bearing hanger assembly (68) increases the ease of vehicle assembly.

15 Claims, 2 Drawing Sheets

CENTER BEARING HANGER ASSEMBLY

TECHNICAL FIELD

The present invention relates generally to a center bearing hanger assembly particularly suited for automotive vehicle applications and more particularly, to an apparatus for attaching a center bearing to an undercarriage of an automotive vehicle while eliminating fasteners.

BACKGROUND OF THE INVENTION

There is a continuous effort to reduce the number of components in automotive vehicles. The reduction in components should be done in a manner such that the costs to produce the components and the vehicle are reduced while still maintaining or increasing ease of manufacturing and assembly of the vehicle.

Now referring to FIG. 1, a typical two-piece drive shaft 10 of an automotive vehicle is shown having a first half 12 and a second half 14. The drive shaft 10 has three U-joints 18; a first U-joint 18a attaching the first half 12 to a transmission, a second U-joint 18b attaching the first half 12 to the second half 14, and a third U-joint 18c attaching the second half 14 to a rear axle. The center of the drive shaft 10 is supported by a center bearing 22 supported by and fastened to a crossmember or bracket 24 using washers 25 and threaded fasteners 26. The crossmember 24 is directly fastened to an undercarriage of the vehicle with additional threaded fasteners 28.

The driveshaft 10 is used when larger distances exist between the transmission and the rear axle of the vehicle. The center bearing 22 provides support in the center of the drive shaft 10 while still allowing the drive shaft 10 to rotate and transfer mechanical energy from the transmission to the rear axle.

The existing attachment method used to attach the center bearing 22 to the undercarriage of the vehicle isolates the center bearing 22 from the undercarriage in only the vertical direction (Z-direction). Therefore, undesired vibration and noise created by the rotation of the drive shaft and movement in the fore, aft, and lateral directions (X and Y directions) are transferred through the undercarriage into an occupant compartment of the vehicle.

A disadvantage also exists during assembly of the vehicle, in that the drive shaft 10 needs to be supported while fasteners 28 are torqued through the crossmember 24 to the undercarriage of the vehicle. Therefore, it is difficult for a single operator to attach the center bearing 22 to the undercarriage without having assistance from additional operators or equipment. This method may increase time, energy, and costs in assembly of the vehicle.

It would be desirable, to support the drive shaft and center bearing of a vehicle without using fasteners. The reduction of fasteners can reduce assembly time, energy, and costs.

It would also be desirable to isolate the drive shaft in the X and Y directions from the undercarriage of the vehicle, thereby preventing the potential for vibration and noise to enter the occupant compartment of the vehicle.

SUMMARY OF THE INVENTION

The forgoing and other advantages are provided by a center bearing hanger assembly for a vehicle having a drive shaft. The center bearing hanger assembly includes a center bearing, which supports the drive shaft, having an outer housing. The outer housing is mechanically coupled to a male hanger. The male hanger is received by a female receptacle. The female receptacle is attached to an undercarriage of the vehicle.

The present invention has several advantages over existing center bearing support assemblies. The present invention decreases the number of assembly components, thereby saving time, energy, and costs in manufacturing and assembling of a vehicle.

Another advantage of the present invention is that it isolates a drive shaft in all directions from an undercarriage of a vehicle. Therefore, vibration and noise created by the rotation of the driveshaft is prevented from entering an inner compartment of a vehicle.

The present invention itself, together with further objects and attendant advantages, is best understood by reference to the following detailed description, with reference to the accompanying drawings.

BRIEF DESCRIPTION OF THE DRAWING

For a more complete understanding of this invention reference should now be had to the embodiment(s) illustrated in greater detail in the accompanying drawing(s) and described below by way of (an) example(s) of the invention.

In the drawings.

DETAILED DESCRIPTION OF THE PREFERRED EMBODIMENT

Figure 1:
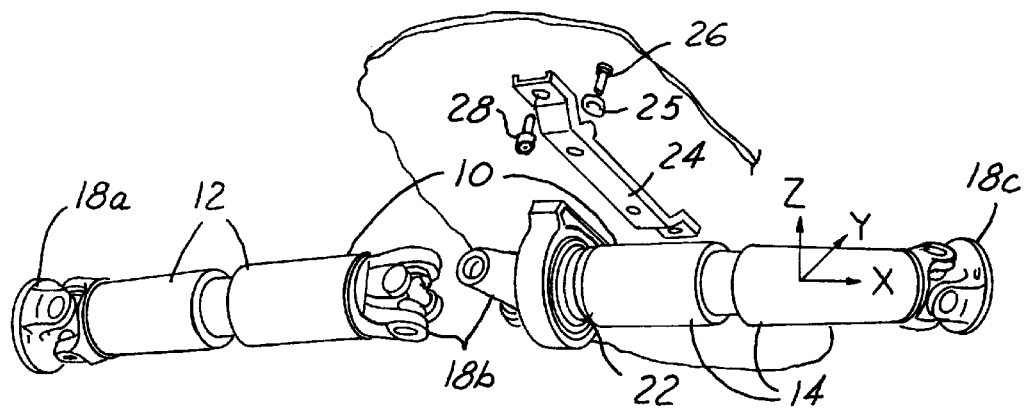
FIG. 1 is a perspective view of a conventional center bearing hanger assembly attached to a driveshaft of a vehicle.

The present invention may be applied in various vehicle applications. In the following figures the same reference numerals are used to refer to the same components. Also in the following description, various operating parameters and components are described for one constructed embodiment. These specific parameters and components are included as examples and are not meant to be limiting.

Figure 2:
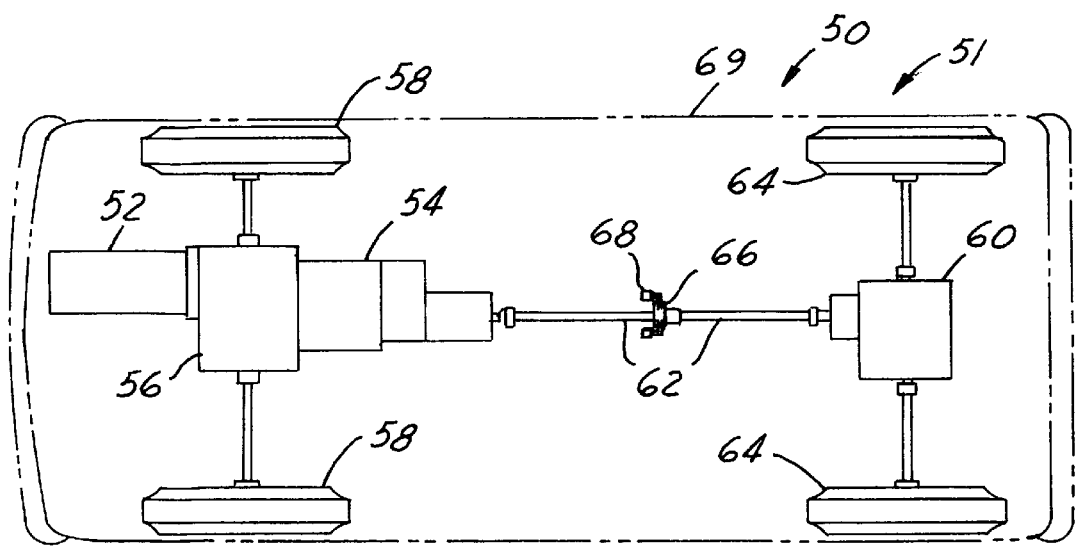
FIG. 2 is a schematic view of a drivetrain of a vehicle in accordance with the present invention.

Referring now to FIG. 2, a schematic view of a drivetrain 50 of a vehicle 51 wherein the present invention may be used to advantage is shown. The drivetrain 50 includes an engine 52 powering a transmission 54. The transmission 54 transfers mechanical power/energy to a front axle drive assembly 56, which rotates a pair of front wheels 58 of the vehicle 51. The transmission 54 also transfers mechanical energy to a rear axle assembly 60 via a drive shaft 62, which in turn rotates the rear wheels 64 of the vehicle 51.

A portion of the drive shaft 62 rotates within a center bearing 66, which is supported by a center bearing hanger assembly 68. The center bearing hanger assembly 68 is attached to an undercarriage 69 of the vehicle 51. The undercarriage 69 may include a floor pan and a vehicle frame. The center bearing 66 isolates the drive shaft 62 from the undercarriage 69 of the vehicle 51 while still allowing the drive shaft 62 to rotate without restriction.

Figure 3:
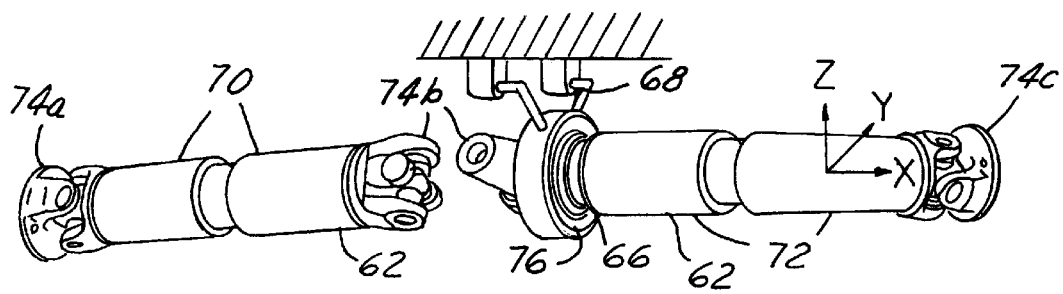
FIG. 3 is a perspective view of a center bearing hanger assembly attached to a driveshaft of a vehicle according to the present invention.

Now referring to FIG. 3, a perspective view of a center bearing hanger assembly 68 attached to the drive shaft 62 of the vehicle 51 according to one embodiment of the present invention is shown. The drive shaft 62 has a first portion 70 and a second portion 72. The drive shaft 62 also has three U-joints 74. The three U-joints 74 allow the first portion 70 and the second portion 72 to rest and operate at different angles relative to not only the transmission 54 and the rear axle assembly 60 but also to each other. The first U-joint 74a attaches the first portion 70 to the transmission 54. The second U-joint 74b attaches the first portion 70 to the second portion 72. The third U-joint 74c attaches the second portion 72 to the rear axle assembly 60. The center bearing 66 is preferably mounted just forward or just rearward of the second U-joint 74b on either the first portion 70 or the second portion 72. The center bearing 66 has an outer housing 76 for attachment thereto. The center bearing 66 is supported and attached to the undercarriage 69 by the center bearing hanger assembly 68.

Figure 4A:
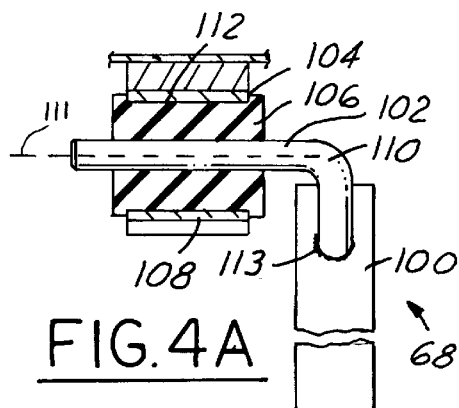
FIG. 4A is a side view of a center bearing hanger assembly according to an embodiment of the present invention.

Now referring also to FIG. 4A, a side view of a center bearing hanger assembly 68 according to an embodiment of the present invention is shown. The center bearing hanger assembly 68 has a bracket 100 surrounding the center bearing 66. The bracket 100 is attached to two male hangers 102 (one shown), which are inserted into two female receptacles 104 (one shown). The receptacles 104 have inner grommets 106 and outer sleeves 108. The hangers 102 are allowed to move within the receptacles 104.

The bracket 100 is preferably made from a rigid material such as steel or other rigid material so as to provide support between the bracket 100 and the center bearing 68. The bracket 100 may be a separate component as shown or may be integrated as part of an outer housing 76 of the center bearing 68.

The hangers 102 are cylindrical rods having a first bend 110. The hangers are able to move in a fore direction and aft direction longitudinally along a center line 111 of the receptacles 104. The hangers 102 may be sealed, using seal 113, to the bracket 100. The seal 113 aids in preventing dirt or other undesirable elements from entering the center bearing 66 and may also prevent bearing lubricant from escaping the center bearing 66 causing degradation to the inner components of the center bearing 66. The seal 113 may be a weld between the hangers 102 and the outer housing 76 or may be sealing material such as: rubber, silicone, gasket material, or some other sealing form or material known in the art.

Although the hangers 102 are shown as cylindrical rods they may be square, round, triangular, or other various shapes. Also, although the hangers 102 are shown as separate components they may be integrated with the bracket 100 and outer housing 76 into a single unified component. The hangers 102 may also be threaded into the bracket 100. The hangers 102 may also be attached to the center bearing 66 by other methods including: welding, molding, stamping, or other various methods known in the art. The hangers 102 may also be of various materials including: steel, alluminum, graphite, ceramic, plastic, or other rigid materials.

The receptacles 104 are toroidal shaped and have sleeves 108 on exterior sides 112 and interior channels 114 in the inner grommets 106. The sleeves 108 may be of various rigid materials, having varying sizes and shapes, and are attached to the undercarriage 69 of the vehicle 51. The sleeves 108 may be part of, or integrally formed to, a bracket or other attachment mechanism, which is attached to the undercarriage 69 or may be molded directly into the undercarriage 69 itself. The inner grommets 106 preferably comprise: rubber, fabric, elastomers, synthetics, plastic, polyvinyl chloride, polyvinyl acetate, polypropylene, polyethylene, or other material having similar properties to the before mentioned materials. The inner grommets 106 provide ease of assembly, flexibility, and allow for movement in all directions. The grommets 106 include inner channels 114 for receiving and allowing hangers 102 to extend therethrough. During vehicle assembly the hangers 102 are "slipped" into the grommets 106.

Figure 4B:
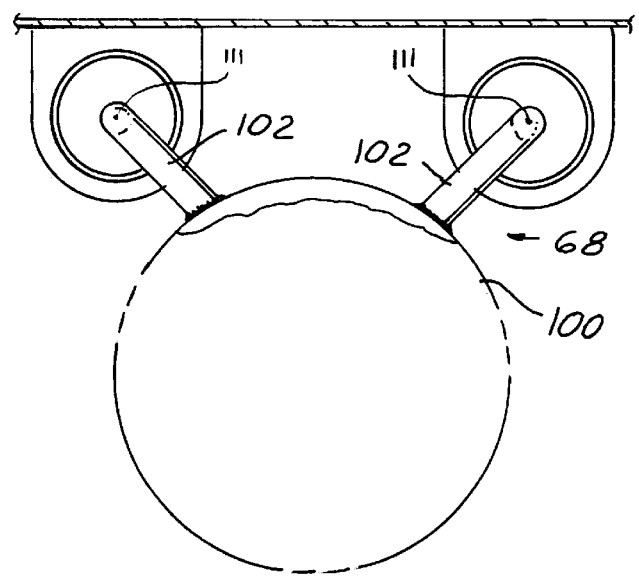
FIG. 4B is a front view of a center bearing hanger assembly according to an embodiment of the present invention.

Now referring also to FIG. 4B, a front view of a center bearing hanger assembly 68 according to an embodiment of the present invention is shown. The bracket 100 is a toroidal shaped bracket that is formed to the exterior shape of the center bearing 66. The bracket 100 is attached preferably to the two hangers 102. The two hangers 102 provide stability for drive shaft 62 in the lateral directions.

The hangers 102 may separate from the receptacles 104, under extreme circumstances caused by the drivetrain 50 of the vehicle 51 having the ability to move in the fore and aft directions (X-direction). To prevent separation of the hangers 102 and the receptacles 104 the center bearing hanger assembly 68 may have various attachment mechanisms to prevent the hangers 102 from separating from the receptacles 104. Of course, by simply varying the lengths of the hangers 102 separation from the receptacles 104 may be avoided without the use of any further attachment mechanisms. On-the-other-hand, the attachment mechanisms not only prevent separation of the hangers 102 from the receptacles 104 but they also provide an operator attaching the assembly 68 with a method of determining when the hangers 102 are properly engaged within the receptacles 104. Another simple techniques to prevent separation of the hangers 102 and the receptacle 104 is to decrease clearances and tighten tolerances between the dimensions of the hangers 102 and the dimensions of the inner channel 114 of the receptacle 104. Smaller clearances and tighter tolerances will provide for a "snug" fit and prevent separation between the hangers 102 and the receptacles 104. The following FIGS. 5–10 refer to possible attachment mechanisms for alternate embodiments of the present invention.

Figure 5:
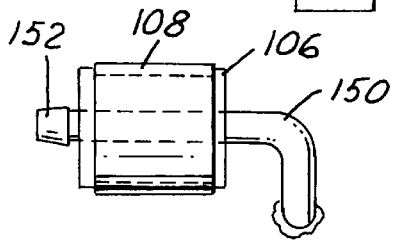
FIG. 5 is a side view of a male hanger and a female receptacle according to another embodiment of the present invention.
Figure 6:
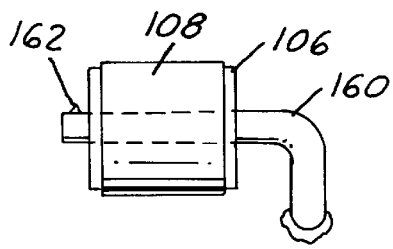
FIG. 6 is a side view of a male hanger and a female receptacle according to a further embodiment of the present invention.
Figure 7:
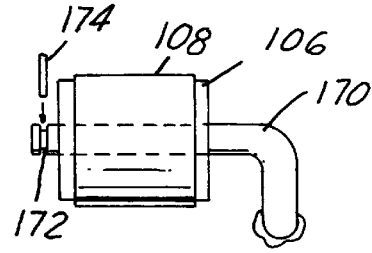
FIG. 7 is a side view of a male hanger and a female receptacle according to another embodiment of the present invention.

Now referring to FIG. 5, a male hanger 150 having a conical shaped end 152 is shown. The conical shaped end 152 provides ease of attachment and prevents the male hanger 150 from pulling out of the receptacle 104. Another alternate embodiment of the present invention is shown in FIG. 6 which includes a male hanger 160 having a clip 162 or recessed bearing to prevent the hanger 160 and receptacle 104 from separating. In FIG. 7, a male hanger 170 is shown, which may have a grove 172 by which a snap ring 174 could engage to prevent the hanger 170 and receptacle 104 from separating.

Figure 8:
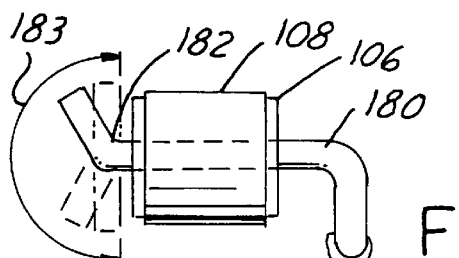
FIG. 8 is a side view of a male hanger and a female receptacle according to a further embodiment of the present invention.

Now referring to FIG. 8, a male hanger 180 may have a second bend 182 with varying angle 183 to prevent the hanger 180 from "slipping out" of the receptacle 104. Of course, multiple bends with varying angles may be used.

Figure 9:
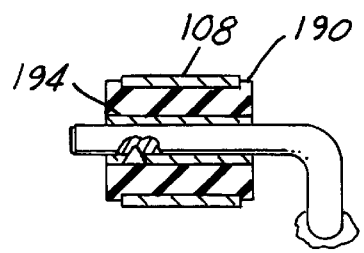
FIG. 9 is a side view of a male hanger and a female receptacle according to another embodiment of the present invention.

Now referring to FIG. 9, a female receptacle 190 having a second sleeve 192 inserted in an inner channel 194 is shown. The second sleeve 192 may have a notch 196 or other attachment mechanism that correlates to a grove 198 or indent on a male hanger 200 to prevent separation of the hanger 200 from the receptacle 190. Of course, other combinations of attachment mechanisms between the hanger 200 and the receptacle 190 may be used.

Figure 10:
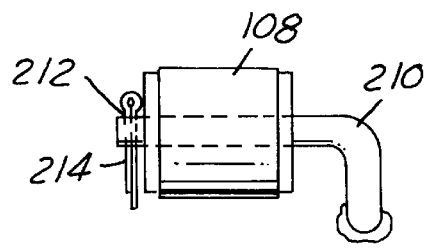
FIG. 10 is a side view of a male hanger and a female receptacle according to another embodiment of the present invention.

Now referring to FIG. 10, a male hanger 210 having a hole 212 for a cotter pin 214 to extend there through is shown to prevent separation of hanger 210 and the receptacle 104.

Figure 11:
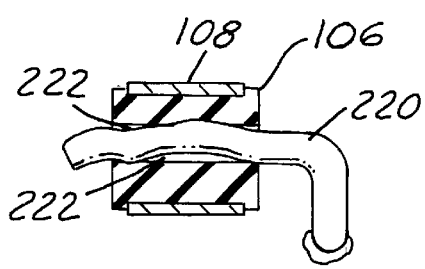
FIG. 11 is a side view of a male hanger and a female receptacle according to another embodiment of the present invention.

Now referring to FIG. 11, an example of a male hanger 220 having different dimensions than the inner channel 114 is shown. The difference in dimensions between the hanger 220 and the receptacle 106 create gaps 222. The gaps 222 create a "loose" fit for easy assembly. When a loose fit is used a prevention method as described above to prevent the hanger 220 from separating from the receptacle 106 is recommended.

The above described attachment mechanisms are not meant to be limiting, other attachment mechanisms may be applied. The aforementioned provides a center bearing support assembly that is low cost, easy to assemble, while at the same time it provides isolation of a drive shaft from an undercarriage of a vehicle. The above-described apparatus and manufacturing method, to one skilled in the art, is capable of being adapted for various purposes and is not limited to vehicle applications. The above-described invention can also be varied without deviating from the true scope of the invention.

While particular embodiments of the invention have been shown and described, numerous variations alternate embodiments will occur to those skilled in the art. Accordingly, it is intended that the invention be limited only in terms of the appended claims.

What is claimed is:

1. A center bearing hanger assembly for supporting a drive shaft of a vehicle having an undercarriage, the assembly comprising:
   a center bearing having an outer housing, said center bearing supporting the drive shaft;
   a male hanger mechanically coupled to said outer housing; and
   a female receptacle for receiving said male hanger, said female receptacle being attached to the undercarriage wherein said female receptacle further comprises an outer sleeve located on an outer side, said outer sleeve being attached to the undercarriage.

2. An assembly according to claim 1 wherein said outer sleeve is a rigid body.

3. A assembly according to claim 1 wherein said female receptacle further comprises an inner sleeve located on an inner channel of said female receptacle.

4. A assembly according to claim 3 wherein said inner sleeve is a rigid body.

5. A assembly according to claim 4 wherein said inner sleeve further comprises an attachment mechanism for preventing separation of said male hanger from said female receptacle.

6. A assembly according to claim 1 wherein said male hanger further comprise an attachment mechanism for preventing separation of said male hanger from said female receptacle.

7. A assembly according to claim 1 wherein said male hanger and said outer housing are integrally formed as a single unified component.

8. A assembly according to claim 1 wherein said male hanger is able to move in a fore direction and aft direction longitudinally along a center line of said female receptacle.

9. A center bearing hanger assembly for supporting a center bearing within a vehicle having an undercarriage, said assembly comprising:
   a bracket attached to the center bearing;
   a male hanger integrally formed to said bracket;
   a female receptacle comprising;
      an inner grommet, said inner grommet receiving said male hanger; and
      an outer sleeve attached to the undercarriage.

10. A assembly according to claim 9 wherein said inner grommet is produced from a material selected from the group comprising: rubber, fabric, elastomers, synthetics, plastic, polyvinyl chloride, polyvinyl acetate, polypropylene, and polyethylene.

11. A assembly according to claim 9 wherein said male hanger further comprise an attachment mechanism for preventing separation of said male hanger from said female receptacle.

12. A assembly according to claim 9 wherein said inner grommet further comprises an inner channel having an attachment mechanism for preventing separation of said male hanger from said female receptacle.

13. A assembly according to claim 9 wherein said inner grommet is flexible to allow the center bearing hanger assembly to move in multiple directions.

14. A center bearing hanger assembly for supporting a center bearing within a vehicle having an undercarriage, said assembly comprising:
   a bracket attached to the center bearing;
   a male hanger integrally formed to said bracket;
   a seal sealing said male hanger to said bracket;
   a female receptacle comprising;
      an inner grommet, said inner grommet having a inner channel for receiving and allowing said male hanger to extend therethrough; and
      an outer sleeve attached to the undercarriage.

15. A assembly according to claim 14 wherein said center bearing hanger assembly further comprises an attachment mechanism for preventing separation of said male hanger from said female receptacle.

* * * * *